June 7, 1949.   R. E. FEARON   2,472,153
METHOD AND APPARATUS FOR DETECTING RADIATIONS
Filed Jan. 13, 1945   3 Sheets-Sheet 1

INVENTOR
ROBERT E. FEARON
BY James Y. Cleveland
ATTORNEY

June 7, 1949.   R. E. FEARON   2,472,153
METHOD AND APPARATUS FOR DETECTING RADIATIONS
Filed Jan. 13, 1945   3 Sheets-Sheet 2
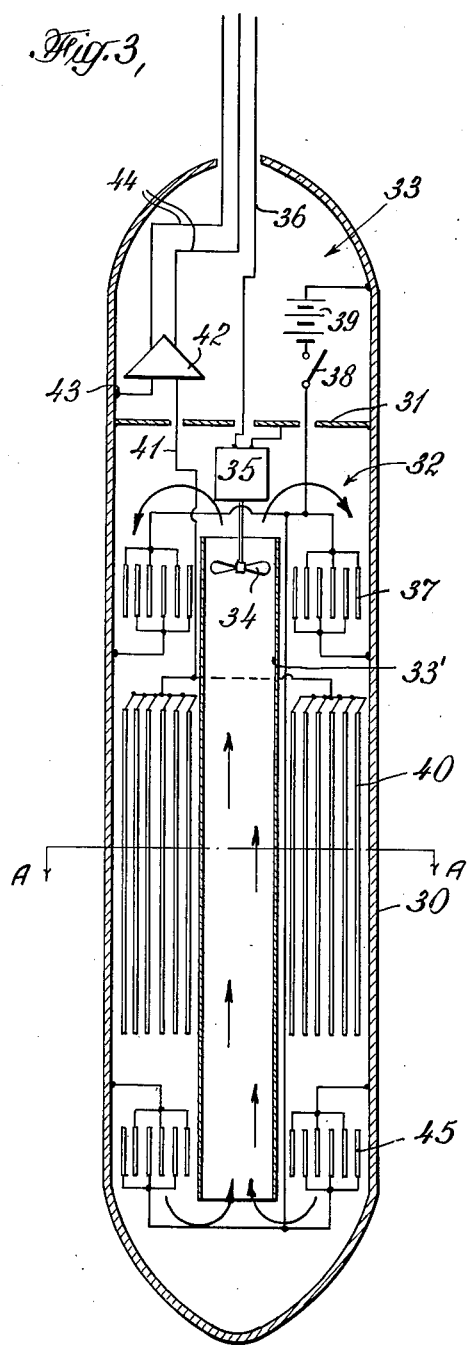
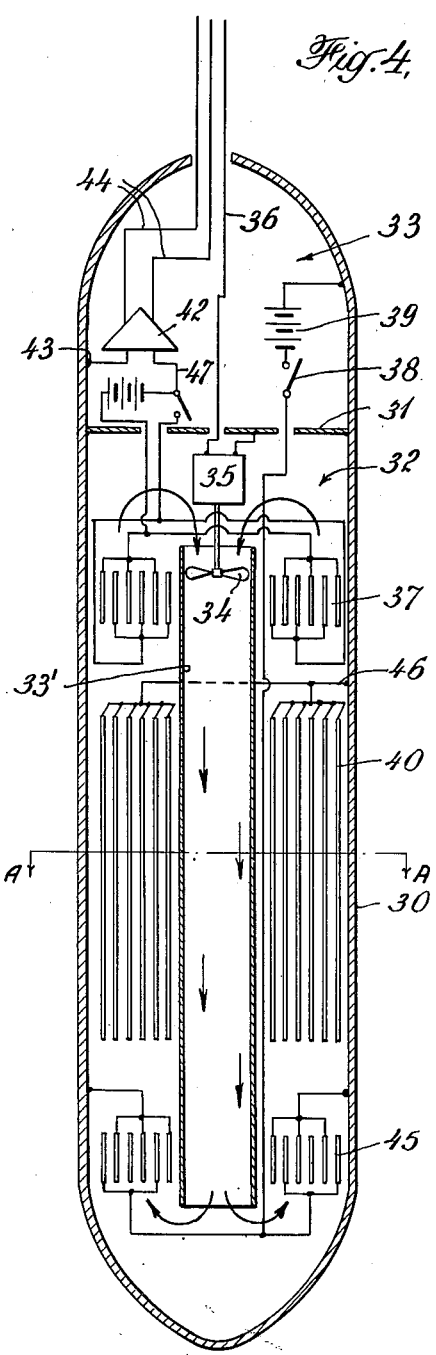
INVENTOR
ROBERT E. FEARON
BY James G. Cleveland
ATTORNEY June 7, 1949.  R. E. FEARON  2,472,153
METHOD AND APPARATUS FOR DETECTING RADIATIONS
Filed Jan. 13, 1945  3 Sheets-Sheet 3
Fig. 5,
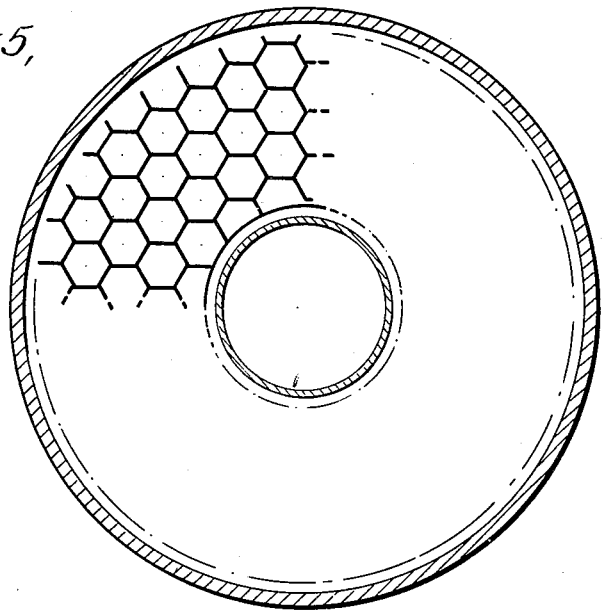
Fig. 6
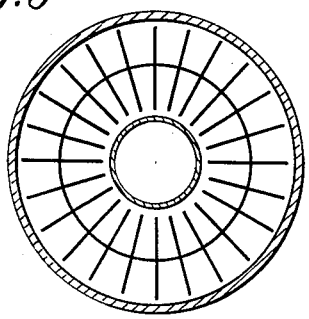
Fig. 7,
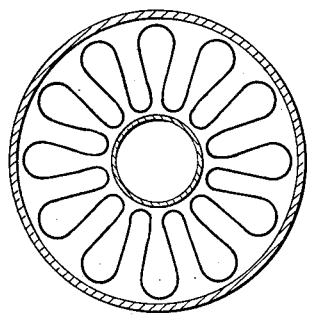
Fig. 8.
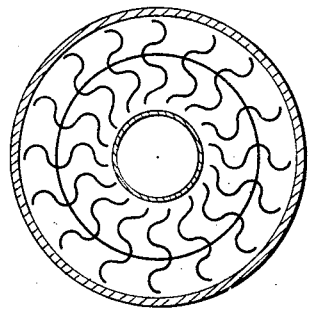
INVENTOR
ROBERT E. FEARON
BY James y. Cleveland
ATTORNEY Patented June 7, 1949

2,472,153

UNITED STATES PATENT OFFICE 2,472,153

METHOD AND APPARATUS FOR DETECTING RADIATIONS

Robert Earl Fearon, Tulsa, Okla., assignor to Well Surveys, Incorporated, Tulsa, Okla., a corporation of Delaware Application January 13, 1945, Serial No. 572,666

12 Claims. (Cl. 250—83.6)

This invention relates generally to the art of radiation measurement and more particularly to radioactivity well logging.

Specifically this invention is directed to the observation or measurement of extremely weak ionizing radiation which measurement is accomplished by subjecting a body of moving ionizable fluid to the ionizing radiation to produce ionization thereof; separating the positive and negative ions; and measuring the electrical current produced by collecting one or the other as an indication of the ionizing radiation. To facilitate the separation of positive ions, a fluid, or mixture of fluids, usually in a gaseous state, is chosen in which there is a great difference of electric mobility of positive and negative ions.

The problem of gamma-ray well logging involves some means of detecting and registering the photons (individual quanta of radiation). Since the number of photons incident upon an instrument of a suitable size to be inserted in a well bore is fairly small under intervals of a few seconds time, it is highly desirable to provide a detector of large efficiency, that is, a detector which absorbs and is affected by a high percentage of photons incident upon its exterior. As a matter of fact, the limit which must be set on the logging speed depends directly upon the efficiency of the detector. The nature of the limitations on the logging speed as set by detector efficiency and by the radioactivity strength of the rock formation is discussed in a paper of W. L. Russell (Well Logging by Radioactivity, vol. 25, No. 9, Bulletin A. A. P. G., pp. 1768-1788, September 1941).

It is possible to increase the efficiency of the detector of gamma rays to a considerable extent by filling it with a gas under a suitable pressure and measuring the ionization current which can be collected from the gas due to the influence of the radiation. This is the type of detector that is now being used commercially by some of the leading companies in this field. The principles of this method of obtaining good efficiency in gamma-ray detectors is described in U. S. Patent No. 2,275,456 that issued to Jacob Neufeld.

As can be readily understood there is a limit to the efficiency which can be obtained by this method of increasing the gas pressure. It is particularly obvious that there is such a limit if one states accurately the definition of efficiency, remembering that it is photons incident upon the exterior that have to be counted. Assuming a detector of fixed external dimensions, designed to hold gas under a pressure P, with a safety factor for bursting which is held constant, it can readily be seen that the thickness of the wall of the ionization chamber is a function of the pressure P. For relatively thin wall vessels, that is, for fairly low pressure, the thickness of the required wall will be directly proportional to the presure P. Thus, for constant outside diameter the space inside, which can be used to contain the compressed gas, constantly decreases as the pressure increases. If to this consideration there is added the fact that, as the thickness of the wall increases fewer photons penetrate to the interior space because of absorption, it can be seen that there must be some pressure at which the efficiency, as referred to the number of photons incident upon the outside surface, begins to decrease again as the pressure increases.

The algebraic equation that must be solved in order to compute the efficiency that corresponds with a different pressure is made up of transcendental functions as well as ordinary rational functions containing the pressure. It is, therefore, a matter of a high order of difficulty to obtain any sort of a general solution of the problem of optimum pressure. One computation has shown that for practical operating conditions, the optimum pressure may be in the neighborhood of two thousand pounds per square inch. In any case, the efficiency which corresponds with the optimum pressure constitutes a natural limit in the family of detectors deriving their efficiency from increased pressure.

From every solid surface which forms the inner lining of an ionization chamber there issues a flux of photo-electrons, the intensity of which is largely independent of the nature of the material of which the lining is composed, and also independent of the thickness of the lining provided this thickness exceeds the range of the beta rays (photo-electrons due to gamma rays) in the material of which the lining is composed.

The Geiger-Mueller counter tube is a special case of an ionization chamber arranged for a very large gas amplification. The gas in the Geiger-Mueller counter tube is so highly rarefied that it does not absorb any appreciable fraction of the photons itself. The operation of the Geiger-Mueller tube is based on the flux of photo-electrons which issues from the inner lining of the counter tube which is usually the cathode. The efficiency of Geiger-Mueller counter tubes is rather consistent and independent of their size or shape provided one considers always the same type of exciting radiation. For radiation having a quantum energy in the neighborhood of one million electron volts, the efficiency of a cylindrical Geiger-Mueller counter tube is on the order of one and one-half per cent. Quite obviously if one were able to make counters having the shape of a thin cylindrical shell and place several of these counters one inside of the other a much greater efficiency could be obtained. Similarly if it were possible to produce a large number of very small counters one could obtain very high efficiency. Likewise if one used a large number of very small relatively thin walled ionization chambers a comparative gain in efficiency would result. In this latter instance the resulting assembly has a serious defect aside from its complexity. This defect is that the electrostatic capacity of the combined collector electrodes on which the ionization current is received becomes very great. Therefore, in order to utilize added efficiency of a system involving many ionization chambers as described above, the sensitivity of the electrometer needed increases as the square of the sensitivity of the composite ionization chamber. This places a very severe requirement on the electrometer.

It is one of the objects of the present invention to provide a method and apparatus for observing weak ionizing radiations which have the efficiency of a complicated assembly of ionization chambers, but which do not have the very large electrostatic capacity.

Except for some gases which disassociate chemically into oppositely charged ions, the existance of ions in any gas is not permanent, but only occurs in the presence of gamma rays, ultra-violet radiation, beta particles, or other ionizing influence. Equally, also, the ions disappear promptly by recombination, when the ionizing influence is removed. By various means which are described fully in Loeb's book "Fundamental Processes of Electrical Discharge in Gases," pp. 1-30, it is possible to measure the electric mobility of the ionic carriers in most gases. It is apparent from the data of such outlined experiments, that the ionic carriers in air are of molecular size for the most part. There is reason to believe that the negative ions in air are negatively charged oxygen molecules. It so happens that the electric mobility of negative ions in the air is approximately equal to the electric mobility of its positive ions. The addition of a trace of methylamine to the air does not particularly alter the truth of the above statement, although in the presence of the added methylamine there is reason to believe that the positive charges are chiefly carried by positively electrified methylamine molecules, instead of by positive molecular nitrogen ions. If instead of methylamine a trace of propylamine is added the mobility of the positive ion would have decreased because of the cumbersomeness of propylamine molecules, which in this case, would be the chief carries of positive charges. Additionally, in some inert gases, and in practically all the rare gases which fall in group zero of Mendeleef's table of the elements, the mobility of the positive ion is what would be expected with the positive charge carried by an atom or molecule which has one electron removed. For these cases, however, the electric mobility of the negative charges is enormously great by comparison. So great is this mobility in fact that one is led to conclude that the negative charge is carried entirely by unassociated electrons.

It is desirable to point out that the diffusibility of the ions is directly proportional to their electric mobility. Accordingly, where there is a diffused cloud of positive and negative ions formed in one of the gases of zero group, it rapidly becomes a diffused cloud of positive ions only since the negative charges very quickly disappear to the walls. This, of course, would not occur when the ion density is sufficient to produce an appreciable space charge which has the effect of retarding the loss of the electrons.

Therefore, it is the primary object of this invention to provide a method and apparatus for detecting and measuring extremely weak ionizing radiation by subjecting a body of moving ionizable fluid, to which has been added a trace of a substance that will, on ionization of the fluid, render the positive ions less mobile electrically than the negative ions, to the weak ionizing radiation to produce proportional ionization thereof; separating the positive and negative ions; and measuring the electrical current produced by collecting one or the other.

Another object of this invention resides in the provision of apparatus whereby the above outlined method can be carried out at various depths in a deep drill hole.

This invention also contemplates a detector of ionizing radiation that comprises an ionization chamber having a circulating ionizable medium therein.

Another object of this invention resides in the provision of apparatus whereby the above outlined method can be carried out while continuously raising or lowering the apparatus in a drill hole.

Another object of this invention resides in the provision of an ionization chamber having a circulating ionizable medium therein, the circulation of which can be varied in accordance with a change in the electric mobility of the positive ions.

Other objects of the present invention will become apparent from the following detailed description when considered with the drawings in which Figure 1 is a diagrammatic illustration of one form of the invention;

Figure 3 is a diagrammatic illustration of a well surveying instrument which utilizes the principles of the present invention as illustrated in Figure 1;

Figure 4 is a diagrammatic illustration of the application of the invention shown in Figure 2 to a well surveying instrument;

Figure 5 is a cross sectional view taken along the line of A—A of Figure 3 or 4 showing one form which the electron collecting plates can assume;

Figure 6 is a modified form of the invention as shown in Figure 5 illustrating a second form of electron collecting plates;

Figure 7 is still another cross sectional view of the well surveying instrument illustrating another form of electron collecting plates; and Figure 8, another cross sectional view of the well surveying instrument, illustrates still another form of electron collecting plates.

Figure 1:
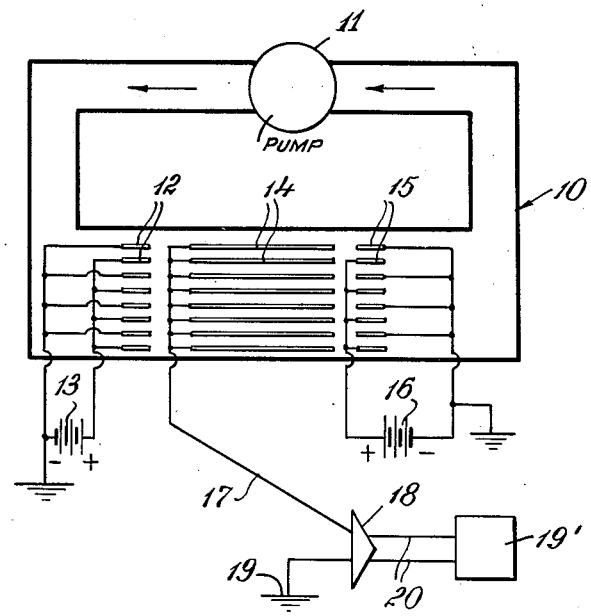

Referring to the drawings in detail, particularly Figure 1, there is illustrated an ionizable medium circulating system 10, having a pump 11, that is adapted on operation to circulate the ionizable medium in the direction indicated by the arrows. The ionizable medium may consist of a gas such as argon plus a trace of propylamine. The trace of propylamine is added to the fluid to reduce the electric mobility of the positive ions. The fluid being circulated by the pump 11, passes through a set of de-ionizing plates 12, of which every other plate is made positive with respect to earth by means of a battery 13. Those plates, which are not positive with respect to earth, are connected to the earth and to the negative terminal of the battery 13. The fluid flowing through the plates 12, is de-ionized, and on leaving these plates enters a zone in which it is desired to measure the ionization. This zone has disposed therein a second set of plates 14. These plates are arranged in such a manner that there are convenient channels to permit the passage of the fluid without undue pneumatic resistance. The thickness of the plates 14, is so chosen, with respect to the nature of the material of which they are composed and with respect to the properties of the ionizing radiation which it is desired to detect, that there is a high degree of probability that any photo-electrons produced in the plates will escape into the space between the plates. The arrangement of these plates may be simply a series of spaced sheets of metal, such as tungsten or iron, supported equidistantly from one another. On the other hand it is not necessary to restrict the system of plates to anything so simple, since any arrangement of sheet metal which permits the fluid to pass and presents a large surface area, will serve the purpose. In Figures 5, 6, 7 and 8, examples are presented in which are a number of other suitable arrangements. The ionizing of the fluid is largely brought about within the arrangement of plates by a tertiary process depending on the photo-electrons issuing from the plates. These latter photo-electrons themselves represent a secondary process being directly excited by the primary radiation.

If we consider the array of plates as a heterogenous radiation-absorbing medium, then the amount of radiation absorbed in a given volume will generally be larger the larger the average density of such heterogenous medium. It is an object of this invention to provide a heterogenous medium of greater density and therefore of radiation-absorbing power than can be attained by using compressed gas as an ionizable fluid in accordance with the teachings of Patent No. 2,275,456 which issued to Jacob Neufeld.

The negative ions produced indirectly by the ionizing radiation, therefore, have considerably more diffusibility than the positive ions, and they will, therefore, be absorbed by the plates 14 more quickly than the positive ions. The reduced diffusibility or electric mobility of the positive ions, due to the proplamine, will cause them to be carried out of the zone occupied by the plates 14, into the zone occupied by a third set of plates 15. Every other one of the plates 15 is connected to the positive side of the battery 16, and the remaining plates are connected to the negative side of the battery 16, and to earth. The plates 15, in the manner described in connection with the plates 12, also function as a means for de-ionizing the fluid as it passes between them.

The electrons collected by the plates 14, produce a current that is drawn off by means of conductor 17, through the input of a direct current amplifier 18, to earth at 19. This current is amplified by the amplifier 18, and conducted to a recorder or meter 19', through the conductor 20. The magnitude of the current passing through the input of the amplifier 18, will be in direct proportion to the ionizing radiation entering the zone occupied by the plates 14.

It is to be understood that the plates 14, will be of sufficient length and configuration that substantially all of the negative ions produced will be collected by them. For example, these plates may be highly convoluted metal sheets so arranged that the ionizable fluid will pass between them; an array of closely packed metal tubes; a space filling arrangement of hexagonal cylinders such as is found in the honeycomb; a stack of parallel sheets held apart by spacers; or a metal sheet folded back and forth on itself, may be suitable. These plates may assume any form that will provide a simple passageway that will present a large amount of surface to the ionizable fluid.

Figure 2:
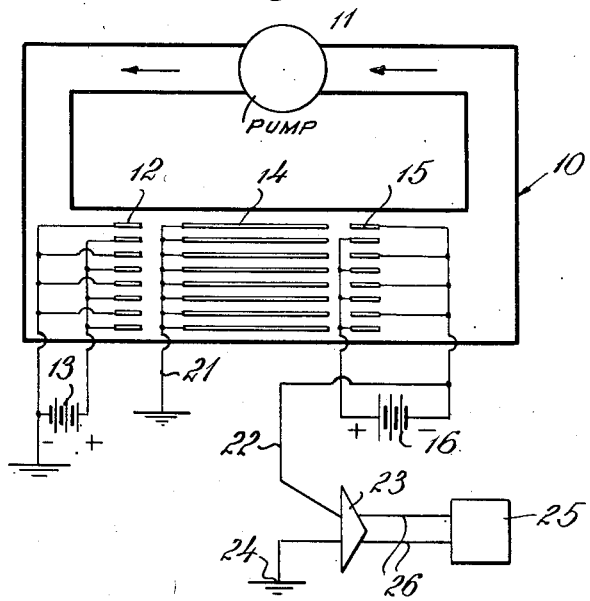
Figure 2 is a diagrammatic illustration of a second form of the present invention showing a modified form of ionization measurement.

The invention as applied in Figure 2 is mechanically the same as that illustrated in Figure 1, differing only in the manner of making the electrical measurement of the detected radiation. In this form of the invention the current transferred by the positive ions is measured as an indication of the ionizing rays entering the zone occupied by the plates 14. The fluid passing over the plates 12 is completely de-ionized, and on entering the zone occupied by the plates 14, is subjected to ionizing radiation which produces ionization of the fluid in amounts proportional to the number of photons entering the zone. Since the diffusibility of the positive ions, due to the addition of a trace of propylamine to the fluid, is greatly reduced without affecting the diffusibility of the negative ions, the negative ions will be absorbed by the plates 14, and the electrical charge thus liberated conducted to earth through the conductor 21. The positive ions, having less mobility, will be swept out of the plates 14 into the zone occupied by the plates 15, by the fluid in its movement where they are absorbed by the negative plates of the group 15. The current formed by the collection of the positive ions on the negative plates 15, is conducted by means of the conductor 22 through the input of a direct current amplifier 23, to earth at 24. This current is amplified by the amplifier 23, and conducted to the recorder 25, by the conductors 26 where it is recorded as an indication of the gamma radiation entering the zone occupied by the plates 14.

Referring to Figure 3, the invention as illustrated in Figure 1 is shown applied to a well surveying instrument. A capsule 30 being so designed that it can be lowered in a drill hole to considerable depths, in a conventional manner well known in the art, and built to withstand the pressures encountered at the depths to which it is lowered, houses all of the equipment necessary for the detection of ionizing rays that radiate from the substrata. The interior of the capsule 30, is divided by a partition 31, into a bottom chamber 32, and an upper chamber 33. Chamber 32, carries the de-ionizing plates, current collecting plates, an ionizable fluid, means defining a circulatory path for said fluid, and means for circulating the fluid. The circulatory path for the ionizable fluid is defined by the inner wall of the chamber 32, and a concentrically disposed cylinder 33'. Cylinder 33' is supported by mechanical means, not shown, axially in the chamber 32, in such a manner that its top and bottom ends are spaced from the partition 31, and the bottom of capsule 33, respectively. Pump 34, illustrated as a fan, is mounted in the top end of the cylinder 33', and driven by an electric motor 35, to circulate the fluid upwardly through the cylinder 33', and downwardly through the confined space outside the cylinder 33'. Motor 35, is supplied with power from the surface by means of an electrical conductor 36, which is carried by the cable that supports the capsule. Disposed around the upper end of the cylinder 33' is a plurality of de-ionizing plates 37, which correspond to the de-ionizing plates 12, in Figure 1. The plates are divided into two groups, one group is connected through a switch 38, to the negative side of a battery 39, and the other group of plates is connected to the positive side of the battery 39, through the wall of the capsule 30. These plates function to de-ionize the fluid as it passes downwardly through them. The de-ionized fluid leaving the plates 37, enters the zone occupied by plates 40. In this zone, because of the presence of ionizing radiations, the fluid is ionized in proportion to the number of photons entering the zone. Since the fluid carries a trace of propylamine the positive ions will have very low diffusibility or electric mobility and will be swept through the plates 40, and will not be appreciably absorbed by these plates. The negative ions, however, due to their high relative diffusibility and electric mobility, will be readily absorbed by the plates 40. The charge thereby liberated is conducted by means of conductor 41 through the input of an amplifier 42, to earth at 43. The current flowing through the input of the amplifier 42, is amplified and conducted to the surface by means of conductors 44, where it may be used to actuate a meter or recorder to form a record that is in correlation with depth. It is to be noted that the switch 38, battery 39, and amplifier 42, are all located in the upper chamber 33, which is sealed off from chamber 32, by the partition 31. Partition 31, is obviously provided with sealing plugs where the conductors pass therethrough. The fluid swept through the plates 40, carrying the positive ions of reduced electric mobility, will be de-ionized by plates 45, which are disposed around the bottom end of the cylinder 33', in the path of the fluid. These plates will, in the manner described in connection with plates 37, receive their potential from battery 39. The fluid passing through these plates is drawn upwardly through the cylinder 33', by the pump 34, to the top of the cylinder from which it emerges to flow through the plates 37, as indicated by the arrows.

In Figure 4, there is illustrated a modified form of well surveying device, differing from that disclosed in Figure 3, in that the fluid is circulated in the opposite direction and the electrical current produced by the collection of the positive ions is recorded as a measurement of the detected radiation. In this form of the invention the pump 34, forces the ionizable fluid downwardly through the cylinder 33', from which it emerges and flows upwardly through the space surrounding the cylinder. The fluid emerging from the bottom of cylinder 33' passes over the de-ionizing plates 45, whose potential is supplied by the battery 39, and upwardly through the electron collecting plates 40. The conformity and the length of the plates 40 are such as will allow substantially all of the electrons to be absorbed by them and the charge thus liberated, conducted to earth through the conductor 46. The positive ions, which are swept through the plates by the fluid in its upward drive, are absorbed by the negative plates of the group 37, in the same manner as explained in connection with Figure 2. The current produced by the absorption of the positive ions is conducted by means of conductor 47, through the input of amplifier 42, to earth at 43. The current passing through the input of amplifier 42, is amplified and conducted to the surface by conductors 44, which are carried by the cable that supports the capsule. At the surface this current actuates an indicator or recorder an amount proportional to the detected radiation.

The plates 40, as indicated in the cross sectional views in Figures 5, 6, 7 and 8 which are taken along the line A—A of Figure 3 or 4 may be arranged in many different ways. Figure 5 illustrates the use of an array of space filling hexagonal cylinders through which the fluid is circulated. In Figure 6 the plates 40 are in the form of radially extending metal sheets that are connected together. In Figure 7 the fluid passageway is formed by a convoluted sheet of metal. As illustrated in Figure 8 the plates 40, may also be in the form of radially convoluted fins formed of sheet metal. Obviously any other arrangement can be used which will present a large amount of metal surface to the fluid as it passes thereover. The plates 40, as illustrated in Figure 3, although connected together, are insulated from the inner wall of the capsule 30 and the cylinder 33'.

Although this invention has been described in detail in connection with a well surveying operation it is to be understood that it is not limited thereto, but it has broader application in that it can be used for surface exploration, laboratory measurements, as well as mine exploration, or for nuclear research.

I claim:

1. A method of detecting extremely weak penetrating radiation that comprises continuously circulating a confined ionizable medium in a closed system, de-ionizing the ionizable medium, subjecting the de-ionized medium to the extremely weak penetrating radiation to produce proportional ionization thereof, separating the ions thus formed in accordance with their electrical mobility, collecting one group of the separated ions, and measuring the electrical current produced by the collection of the ions as a measure of the extremely weak penetrating radiation that enters the ionizable medium.

2. A method of detecting extremely weak penetrating radiation that comprises continuously circulating a confined ionizable medium in a closed system, de-ionizing the ionizable medium, subjecting the de-ionized medium to the extremely weak penetrating radiation to produce proportional ionization thereof, separating the ions thus formed in accordance with their electrical mobility, collecting the separated positive ions and measuring the electrical current produced by the collected positive ions as a measure of the extremely weak penetrating radiation that enters the ionizable medium.

3. A method of detecting extremely weak penetrating radiation that comprises continuously circulating a confined ionizable medium in a closed system, de-ionizing the ionizable medium, subjecting the de-ionized medium to the extremely weak penetrating radiation to produce proportional ionization thereof, separating the ions thus formed in accordance with their electrical mobility, collecting the separated negative ions and measuring the electrical current produced by the collected negative ions as a measure of the extremely weak penetrating radiation that enters the ionizable medium.

4. A detector of ionizing radiation comprising in combination means defining a closed circulatory system, at least a portion of which is adapted to admit ionizing radiation, an ionizable medium in said system, means for circulating said medium in the system to expose it to the admitted radioactive emanations, means for de-ionizing said medium before it enters the portion adapted to admit ionizing radiation, means for separating the ions produced by said radiation when the medium enters that portion, and means for collecting one group of the separated ions as a measure of said radiation.

5. An apparatus for detecting penetrating radiation that comprises in combination a sealed system, an ionizable medium in said system, means for cyclically circulating said medium in said system, means in the path of said medium for de-ionizing said medium, said system having a zone in which the penetrating radiation enters the ionizable medium to produce ionization of the de-ionized medium, means adjacent said zone for collecting the negative ions, means at another point in the path of circulation of said medium for subsequently collecting the positive ions, and means for amplifying and recording the current produced by the collection of one group of the ions.

6. An apparatus for detecting penetrating radiation that comprises in combination a sealed system, an ionizable medium in said system, means for cyclically circulating said medium in said system, means in the path of said medium for de-ionizing said medium, said system having a zone in which the penetrating radiation enters the ionizable medium to produce ionization of the de-ionized medium, means adjacent said zone for collecting the negative ions, means at another point in the path of circulation of said medium for subsequently collecting the positive ions, and means for amplifying and recording the current produced by the collection of the negative ions.

7. An apparatus for detecting penetrating radiation that comprises in combination a sealed system, an ionizable medium in said system, means for cyclically circulating said medium in said system, means in the path of said medium for de-ionizing said medium, said system having a zone in which the penetrating radiation enters the ionizable medium to produce ionization of the de-ionized medium, means adjacent said zone for collecting the negative ions, means at another point in the path of circulation of said medium for subsequently collecting the positive ions, and means for ampliyfing and recording the current produced by the collection of the positive ions.

8. An apparatus for detecting penetrating radiation that comprises in combination a sealed system, an ionizable medium in said system, means for circulating said medium, means in the path of said medium for de-ionizing said medium, means for separating positive and negative ions formed by subjecting the de-ionized medium to the penetrating radiation, and means for recording the current produced by collecting one group of the separated ions as an indication of the intensity of the penetrating radiation.

9. An apparatus for detecting penetrating radiation that comprises in combination a sealed system, an ionizable medium in said system, means for circulating said medium, means in the path of said medium for de-ionizing said medium, means for separating positive and negative ions formed by subjecting the de-ionized medium to the penetrating radiation, and means for recording the current produced by collecting the separated negative ions as an indication of the intensity of the penetrating radiation.

10. An apparatus for detecting penetrating radiation that comprises in combination a sealed system, an ionizable medium in said system, means for circulating said medium, means in the path of said medium for de-ionizing said medium, means for separating positive and negative ions formed by subjecting the de-ionized medium to the penetrating radiation, and means for recording the current produced by collecting the separated positive ions as an indication of the intensity of the penetrating radiation.

11. A detector of radioactive emanations comprising in combination a closed circulatory system; an ionizable medium in said system; means for circulating said medium in said system; said circulatory system having in succession in the path of the circulating ionizable medium, a de-ionizing zone, and ionizing zone and a second de-ionizing zone; de-ionizing means in each of said de-ionizing zones; means in said ionizing zone for separating the positive and negative ions produced by the action of radioactive emanations on said ionizable medium; means for collecting one group of the separated ions and means for recording the electrical current produced by the collection of one group of ions as a measure of the radioactive emanations.

12. A method of detecting penetrating radiation that comprises circulating a confined ionizable medium in a closed system, subjecting the medium to the penetrating radiation to produce ionization thereof, separating the ions thus formed in accordance with their electrical mobility, collecting one group of the separated ions, and measuring the electrical current produced by the collection of the ions as a measure of the penetrating radiation that enters the ionizable medium.

ROBERT EARL FEARON.

REFERENCES CITED

The following references are of record in the file of this patent:

UNITED STATES PATENTS

| Number | Name | Date |
|---|---|---|
| 1,808,709 | Blake | June 2, 1931 |